Patented Dec. 12, 1950

2,533,206

UNITED STATES PATENT OFFICE 2,533,206

PROCESS FOR PREPARING OXONOL DYES

Samuel G. Dent, Jr., and Leslie G. S. Brooker, Rochester, N. Y., assignors to Eastman Kodak Company, Rochester, N. Y., a corporation of New Jersey No Drawing. Application February 24, 1949, Serial No. 78,234

8 Claims. (Cl. 260—240.2)

This invention relates to a process for preparing oxonol dyes and to new dyes obtainable thereby.

It is well known that certain pyrazolone oxonol dyes can be prepared by condensing a pyrazolone compound with an ortho ester. For example, a dye of the following formula:

I 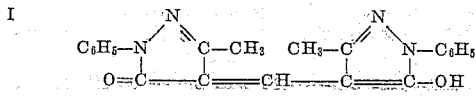

has been prepared by condensing two molecular proportions of 3-methyl-1-phenyl-5-pyrazolone with one molecular proportion of ethyl orthoformate (Claisen—"Annalen der Chemie," vol. 297 (1897), p. 37).

The synthesis of Claisen is limited in its applicability, however, since 2-thio-2,4(3,5)-thiazolediones (rhodanines), 2-thio-2,4(3,5)-oxazolediones and 2-thio-2,4(3,5)-imidazolediones (2-thiohydantoins) cannot be condensed with esters of orthoformic acid, such as ethyl orthoformate, to give oxonol dyes. In Brooker and Keyes U. S. Patent 2,241,238, dated May 6, 1941, one method for preparing these heretofore unattainable dyes is described.

We have now found that the dye represented by Formula I, and a large number of dyes which cannot be prepared by the ortho ester method of Claisen, can be prepared by still another method which comprises condensing an organic compound containing a reactive methylene group adjacent to a carbonyl group with a dialkoxymethyl carboxylate (e. g. diethoxymethyl acetate, etc.).

It is, accordingly, an object of this invention to provide a process for preparing oxonol dyes. Another object is to provide new oxonol dyes, some of which are useful in sensitizing photographic silver-halide emulsions and some of which are useful in the preparation of overcoating layers, filter and antihalation layers. A still further object is to provide photographic emulsions and photographic elements (filter layers, antihalation layers, etc.) containing these new dyes. Other objects will become apparent from a consideration of the following examples and description.

In accordance with our invention, we condense an organic compound containing a reactive methylene group adjacent to a carbonyl group (i. e. an organic compound containing a —CH$_2$—CO— group) with a dialkoxymethyl carboxylate (e. g. diethoxymethyl acetate, etc.).

As organic compounds containing a reactive methylene group, those represented by the following two general formulas can be used:

II 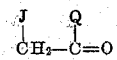

and

III 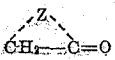

wherein J represents a member selected from the group consisting of a cyano group, a carboxyl group, a carbalkoxyl group (e. g. a carbomethoxyl, carbethoxyl etc. group), an acyl group of a carboxylic acid (e. g. acetyl, propionyl, etc. groups), a carbamyl group and a heterocyclic nucleus of the quinoline series (e. g. a 2- or 4-quinolyl group), Q represents a member selected from the group consisting of a hydroxyl group, an alkyl group (e. g. methyl, ethyl, etc. groups), an aryl group (e. g. a phenyl group, an o- or p-tolyl group, etc.), an amino group (e. g. a —NH$_2$ group, an anilino group, etc.), a carbalkoxyl group (e. g. carbomethoxyl, carbethoxyl, etc. groups), an alkoxyl group (e. g. methoxyl, ethoxyl, etc. groups) and a heterocyclic nucleus of the benzofuryl series (e. g. a benzofuryl group, etc.) and Z represents the non-metallic atoms necessary to complete a nucleus selected from the group consisting of a heterocyclic nucleus containing from 5 to 6 atoms in the heterocyclic ring and a carbocyclic nucleus containing 5 atoms in the ring (e. g. an indandione nucleus). Especially advantageous are compounds represented by Formula III wherein Z represents the non-metallic atoms necessary to complete a heterocyclic nucleus having from 5 to 6 atoms in the heterocyclic ring. Typical of the nuclei represented by Formula III are those of the thiazolone series, for example: those of the 2,4(3;5)-thiazoledione series, such as 2,4(3,5)-thiazoledione, 3-alkyl-2,4(3,5)-thiazolediones (e. g. 3-ethyl-2,4(3,5)-thiazoledione, etc.), 3-phenyl-2,4(3,5)-thiazoledione, 3-α-naphthyl-2,4(3,5)-thiazoledione, etc., those of the 2-thio-2,4(3,5)-thiazoledione (rhodanine) series, such as 3-alkyl-2-thio-2,4(3,5)-thiazolediones (3-alkylrhodanines) (e. g. 3-ethyl-2-thio-2,4(3,5)-thiazoledione or 3-ethylrhodanine), 3-phenyl-2-thio-2,4(3,5)-thiazoledione (3-phenylrhodanine), 3-α-naphthyl-2-thio-2,4(3,5)-thiazoledione (3-α-naphthylrhodanine), 3-(1-benzothiazyl)-2-thio- 2,4(3,5)-thiazoledione (3-(1-benzothiazyl)rhodanine), etc., those of the 2-alkylmercapto-4(5)-thiazolone series, such as 2-ethylmercapto-4(5)-thiazolone, etc., those of the thiazolidone series, such as 4-thiazolidone or its 3-alkyl (e. g. ethyl, etc.), 3-phenyl or 3-α-naphthyl derivatives, those of the 2-alkylphenylamino-4(5)-thiazolone series (e. g. 2-ethylphenylamino-4(5)-thiazolone, etc.), those of the 2-diphenylamino-4(5)-thiazolone series; those of the oxazolone series, for example: those of the 2-thio-2,4(3,5)-oxazolidione series, such as 3-alkyl-2-thio-2,4(3,5)-oxazolidiones (e. g. 3 - ethyl - 2 - thio - 2,4(3,5) - oxazolidione, etc.), those of the 2-imino-2,4(3,5)-oxazolone (pseudohydantoin) series, etc.; those of the imidazolone series, for example: those of the 2,4(3,5)-imidazoledione series, such as 2,4(3,5)-imidazoledione (hydantoin) or its 3-alkyl (e. g. ethyl, etc.), 3-phenyl or 3-α-naphthyl derivatives as well as its 1,3-dialkyl (e. g. 1,3-diethyl, etc.), 1-alkyl-3-phenyl (e. g. 1-ethyl-3-phenyl, etc.), 1-alkyl-3-naphthyl (e. g. 1-ethyl-3-α-naphthyl, etc.), 1,3-diphenyl, etc. derivatives, those of the 2-thio-2,4(3,5)-imidazoledione series, such as 2-thio-2,4(3,5)-imidazoledione (2-thiohydantoin) or its 3-alkyl (e. g. 3-ethyl, etc.), 3-phenyl or 3-α-naphthyl derivatives as well as its 1,3-dialkyl (e. g. 1,3-diethyl, etc.), 1-alkyl-3-phenyl (e. g. 1-ethyl-3-phenyl, etc.), 1-alkyl-3-naphthyl (e. g. 1-ethyl-3-α-naphthyl), 1,3-diphenyl, etc. derivatives, those of the 2-alkylmercapto-5(4)-imidazolone series, such as 2-n-propylmercapto-5(4)-imidazolone; those of the thionaphthenone series, such as 2(1)-thionaphthenone or 1(2)-thionaphthenone; those of the pyrazolone series, such as pyrazolone or its 1-alkyl (e. g. methyl, ethyl, etc.), 1-phenyl, 1-naphthyl (e. g. 1-α-naphthyl), 3-alkyl (e. g. methyl, ethyl, etc.), 3-phenyl, 3-naphthyl (3-α-naphthyl), 1-alkyl-3-phenyl (e. g. 1-methyl-3-phenyl, etc.), 3-alkyl-1-phenyl (e. g. 3-methyl-1-phenyl, etc.), 1,3-dialkyl (e. g. 1,3-dimethyl, etc.), 1,3-diphenyl, etc. derivatives; those of the oxindole series, such as 2,3-dihydro-3-ketoindole, and like five-membered heterocyclic nuclei; those of the 2,4,6-triketohexahydro- series, for example, 2,4,6,-triketohexahydropyrimidine (barbituric acid), 2-thio-2,4,6-triketohexahydropyrimidine (2-thiobarbituric acid) as well as their 1-alkyl (e. g. 1-ethyl, etc.) or 1,3-dialkyl (1,3-diethyl, etc.) derivatives; those of the 3,4-dihydro-2(1)-quinolone series, such as 3,4-dihydro-2(1)-quinolone (dihydrocarbostyril); those of the 3,4-dihydro-2(1)-quinoxalone series, such as 3,4-dihydro-2(1)-quinoxalone (oxydihydroquinoxaline), etc.; those of the 3-phenomorpholone (1,4,3-benzoxazine-3(4)-one or benzo-β-morpholone) series, such as 3-phenomorpholone, etc.; those of the 1,4,2-benzothiazine - 3(4) - one (ketodihydrobenzoparathiazine) series, such as ketodihydrobenzoparathiazine, etc., and like six-membered heterocyclic nuclei. The compounds of Formula III wherein Z represents the non-metallic atoms necessary to complete a five-membered heterocyclic nucleus containing a nuclear nitrogen and a nuclear thiocarbonyl group give rise to dyes which provide emulsions of particular utility. Those compounds of Formula III wherein Z represents the non-metallic atoms necessary to complete a six-membered heterocyclic nucleus containing two nuclear nitrogen atoms and a nuclear thiocarbonyl group also provide dyes which are excellently adapted for the manufacture of photographic silver halide emulsions.

The dialkoxymethyl carboxylates advantageously employed in practicing our invention can be represented by the following general formula:

IV 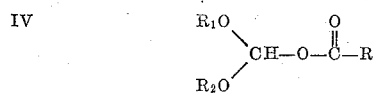

wherein R, R₁ and R₂ each represents an alkyl group, such as methyl, ethyl, n-propyl, isopropyl, n-butyl, isobutyl, etc. groups (e. g. an alkyl group having the formula $C_nH_{2n+1}$ wherein $n$ represents a positive integer from 1 to 4). The esters represented by Formula IV can advantageously be prepared by reacting an ortho ester (e. g. triethyl orthoformate, etc.) with a carboxylic acid anhydride (e. g. acetic anhydride, etc.). Such a method is described by H. W. Post in "Jour. Organ. Chem.," vol. 2 1937), pp. 260–266. Diethoxymethyl acetate has been found to be especially useful in practicing our invention, although other esters, e. g. diethoxymethyl propionate, etc. can be used.

The condensations of our invention can be carried out in the presence or absence of a solvent or diluent. As solvents or diluents, we can use the tertiary amines, e. g. triethylamine, tri-n-butylamine, pyridine, etc., carboxylic acid anhydrides (e. g. acetic anhydride, etc.), cyclic ethers (e. g. 1,4-dioxane), piperidine, acetic acid, formamide, nitromethane, nitrobenzene, cresols, etc. The condensations are accelerated by heat, and generally, it is advantageous to subject the reactants to temperatures above room temperature.

The following examples will serve to illustrate more fully the manner whereby we practice the process of our invention.

*Example 1.—Bis[3 - ethylrhodanine - (5)]methinoxonol, triethylamine salt*

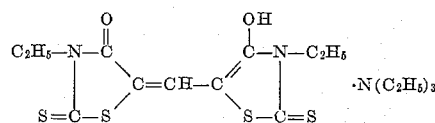

A mixture of 6.4 g. (2 mol.) of 3-ethylrhodanine, 3.2 g. (1 mol.) of diethoxymethyl acetate and 5 cc. of triethylamine was heated at the temperature of a steam bath for 30 minutes, cooled, and poured with stirring into 200 cc. of ice-cold diethyl ether. The solid dye which separated was collected on a funnel, washed with more ether, and dried. The yield of dye was 46% crude and 29% after recrystallization from ethyl alcohol (10 cc./g. of dye). The triethylamine salt of the dye melted at about 178° C., and gave a bluish-red solution in methyl alcohol.

*Example 2.—Bis(benzoylacetonitrile)-methinoxonol*

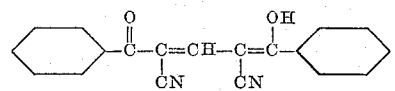

A solution of 5.8 g. (2 mol.) of benzoylacetonitrile and 3.2 g. (1 mol.) of diethoxymethyl acetate in 15 cc. of pyridine was refluxed for 1½ hours, cooled, made acid with concentrated hydrochloric acid, and again chilled. The precipitated solids were collected on a funnel, washed with a little ethyl alcohol, and then dried. The yield of crude dye was 3.7 g. (62%), and this was purified by dissolving the solid dye in 75 cc. of ethyl alcohol and 3 g. of triethylamine, and precipitating the dye with hydrochloric acid. After two such recrystallizations, the dye melted at about 238° C.

*Example 3.—Bis[3 - ethyl - 1 - phenyl - 2 - thiohydantoin - (5)]methinoxonol*

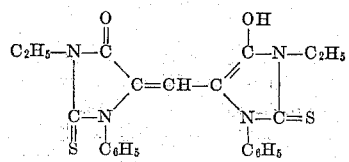

A solution of 8.8 g. (2 mol.) of 3-ethyl-1-phenyl-2-thiohydantoin and 3.2 g. (1 mol.) of diethoxymethyl acetate in 10 cc. of piperidine was heated by means of an oil bath to 120° C. for 17 hours. After cooling to room temperature, the dark viscous product was poured with stirring into 300 cc. of water containing 10 cc. of acetic acid. The viscous brown oil which precipitated was separated by decanting the aqueous layer, and the oil was washed with stirring with three portions of water. The oily product was then dissolved in hot ethyl alcohol, about 15% by volume of water was added along with enough acetic acid to make the solution slightly acidic. After chilling, a pinkish-white solid was collected on the funnel, washed with a little diethyl ether and dried. The yield of dye was 56% crude and 14% after two recrystallizations from ethyl alcohol (250 cc./g. of dye). The dye melted at about 203° C. and gave a yellow solution in methyl alcohol.

*Example 4.—Bis[1 - ethyloxindole - (3)]methinoxonol*

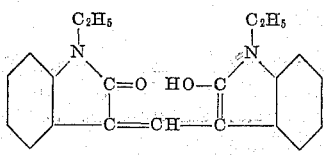

A solution of 6.4 g. (2 mol.) of 1-ethyloxindole and 3.2 g. (1 mol.) of diethoxymethyl acetate in 10 cc. of piperidine was heated at 120° C. for 17 hours by means of an oil bath. After cooling, the amber-colored oily mixture was poured with stirring into 300 cc. of water made slightly acidic with acetic acid. The orange oil was washed twice with water and then stirred with ethyl alcohol, whereupon a red crystalline solid separated. The yield of dye was 17% crude and 12% after two recrystallizations from ethyl alcohol (300 cc./g. of dye). The dye (acid) melted at about 184° C. and gave a yellow solution in methyl alcohol.

*Example 5.—Bis[2 - diphenylamino - 4(5) - thiazolone - (5)]methinoxonol pyridine salt*

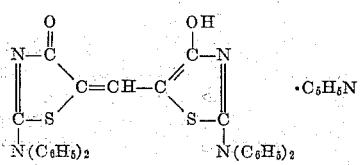

A mixture of 5.36 g. (2 mol.) of 2-diphenylamino-4(5)-thiazolone and 1.62 g. (1 mol.) of diethoxymethyl acetate in 10 cc. of piperidine was heated at 120° C. for one hour by means of an oil bath. The reddish reaction product was cooled to room temperature and poured with stirring into 300 cc. of cold water which had been acidified with acetic acid. The oily product which separated was stirred with two portions of water and then dissolved in 75 cc. of hot ethyl alcohol. The red solid which crystallized out upon cooling the alcohol solution was collected on a funnel, washed with a little diethyl ether and dried. The yield of dye was 11% crude and 6% after two recrystallizations from a pyridine-ethyl alcohol mixture. The pyridine salt of the dye melted at about 258° C. and its solution in methyl alcohol was pink.

*Example 6.—Bis[3 - methyl - 1 - phenyl - 5-pyrazolone - (4)]methinoxonol*

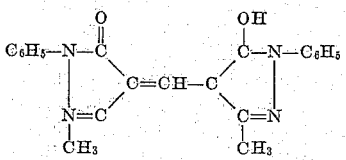

8.7 g. (2 mol.) of 3-methyl-1-phenyl-5-pyrazolone and 8 g. (1 mol. + 100% excess) of diethoxymethyl acetate were mixed in a 50 cc. flask fitted with a short, wide tube and a thermometer. The temperature of the reaction mixture was raised slowly by means of a heating mantle to 110° C., at which point the reaction mixture began to boil. While the low-boiling vapor which was evolved was allowed to escape, the temperature of the reaction mixture was slowly raised over a period of one hour to 133° C., at which point the evolution of the vapor almost ceased. The hot reaction mixture then was poured with stirring into 250 cc. of hot ethyl alcohol, whereupon orange-yellow needles separated from the hot mixture. After chilling, the solids were collected on a funnel, washed with ethyl alcohol and dried. The yield of crude dye was 8.8 g. (98%), and after recrystallization from acetic acid (10 cc./g. of dye), an 84% yield of pure dye melting at about 182° C. was obtained.

Operating in a manner similar to that set forth in the above examples, other organic compounds containing a reactive methylene group represented by Formulas II and III above can be reacted with a dialkoxymethyl carboxylate represented by Formula IV above.

Some of the dyes prepared in accordance with the process of our invention are useful in altering the sensitivity of photographic silver-halide emulsions. Such dyes include those prepared from the compounds represented by Formula III above, for example, wherein Z represents the non-metallic atoms necessary to complete a heterocyclic nucleus containing a nuclear nitrogen atom and a nuclear thiocarbonyl group (particularly a rhodanine, a thiohydantoin or a 2-thio-2,4(3,5)-oxazoledione nucleus). The free dyes are sometimes much stronger sensitizers of photographic emulsions than the dye-salts.

In the preparation of photographic emulsions containing such dyes, it is only necessary to disperse the dyes in the emulsions. It is convenient to add the dyes to the emulsions in the form of solutions in appropriate solvents. The solvent must, of course, be compatible with the emulsion, substantially free from any deleterious effect on the light-sensitive materials in the emulsions and capable of dissolving the dyes. Methanol is a satisfactory solvent for our dyes. Acetone can be employed. The dyes are advantageously incorporated in the finished washed emulsions and should be uniformly distributed throughout the emulsions.

The concentration of our dyes in the emulsions can vary widely, e. g. from about 2 to 100 mg.

per liter of ordinary flowable gelatino-silver-halide emulsion. The concentration of dye will vary according to the type of light-sensitive materials employed in the emulsion and according to the effects desired. The suitable and most economical concentration for any given emulsion will be apparent to those skilled in the art, upon making the ordinary tests and observations customarily employed in the art of emulsion-making. To prepare a gelatino-silver-halide emulsion, the following procedure is satisfactory: A quantity of the dye is dissolved in methyl alcohol or acetone and a volume of this solution (which may be diluted with water) containing from 2 to 100 mg. of dye is slowly added to 1000 cc. of a flowable gelatino-silver-halide emulsion with stirring. Stirring is continued until the dye is thoroughly incorporated in the emulsion. Ordinarily from 10 to 20 mg. of our new dyes per liter of emulsion suffice to produce the maximum sensitizing effect.

For the preparation of overcoating layers, filter layers and antihalation layers, according to our invention, from 50 mg. to 150 mg. of dye are dissolved in from 2 to 5 cc. of a water-miscible solvent. Methanol, or acetone, is suitable for this purpose, but pyridine or β-ethoxyethanol can also be used. The solution is then added to about 25 cc. of a 5% gelatin solution at 40° C. and the mixture coated on the support.

What we claim as our invention and desire to be secured by Letters Patent of the United States is:

1. A process for preparing a dye comprising condensing an organic compound containing a keto-methylene (—CH₂CO—) group selected from the group consisting of those represented by the following two general formulas:

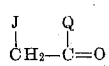

and

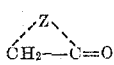

wherein J represents a member selected from the group consisting of a cyano group, a carboxyl group, a carbalkoxyl group, an acyl group of a carboxylic acid, a carbamyl group and a heterocyclic nucleus of the quinoline series, Q represents a member selected from the group consisting of a hydroxyl group, an alkyl group, an aryl group, a carbalkoxyl group, an alkoxyl group and a heterocyclic nucleus of the benzofuryl series and Z represents the non-metallic atoms necessary to complete a heterocyclic nucleus selected from those of the 2,4(3,5)-thiazoledione series, those of the 2-thio-2,4(3,5)-thiazoledione series, those of the 2-alkylmercapto-4(5)-thiazolone series, those of the thiazolidone series, those of the 2-alkylphenylamino-4(5)-thiazolone series, those of the 2-diphenylamino-4(5)-thiazolone series, those of the 2-thio-2,4(3,5)-oxazoledione series, those of the 2-imino-2,4(3,5)-oxazolone series, those of the 2,4(3,5)-imidazoledione series, those of the 2-thio-2,4(3,5)-imidazoledione series, those of the 2-alkylmercapto-5(4)-imidazolone series, those of the thionaphthenone series, those of the pyrazolone series, those of the oxindole series, those of the 2,4,6-triketohexahydropyrimidine series, those of the 3,4-dihydro-2(1)-quinolone series, those of the 3,4-dihydro-2(1)-quinoxalone series, those of the 3-phenomorpholone series and those of the 1,4,2-benzothiazine-3(4)-one series, with a dialkoxymethyl carboxylate selected from those represented by the following general formula:

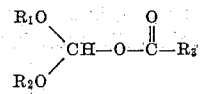

wherein R₁, R₂ and R₃ each represents an alkyl group of the formula $C_nH_{2n+1}$ wherein $n$ represents a positive integer from 1 to 4.

2. A process for preparing a dye comprising condensing an organic compound containing a ketomethylene (—CH₂—CO—) group selected from those represented by the following general formula:

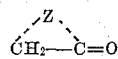

wherein Z represents the non-metallic atoms necessary to complete a heterocyclic nucleus of the 2-thio-2,4(3,5)-thiazolidone series with a dialkoxymethyl carboxylate selected from those represented by the following general formula:

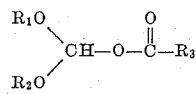

wherein R₁, R₂ and R₃ each represents an alkyl group of the formula $C_nH_{2n+1}$ wherein $n$ represents a positive integer from 1 to 4.

3. A process for preparing a dye comprising condensing an organic compound containing a ketomethylene (—CH₂—CO—) group selected from those represented by the following general formula:

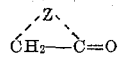

wherein Z represents the non-metallic atoms necessary to complete a heterocyclic nucleus of the 2-thio-2,4(3,5)-thiazolidone series with a dialkoxymethyl acetate selected from those represented by the following general formula:

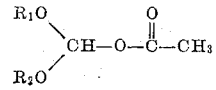

wherein R₁ and R₂ each represents an alkyl group of the formula $C_nH_{2n+1}$ wherein $n$ represents a positive integer from 1 to 4.

4. A process for preparing a dye comprising condensing 3-ethyl-2-thio-2,4(3,5)-thiazoledione (3-ethylrhodanine) with diethoxymethyl acetate.

5. A process for preparing a dye comprising condensing an organic compound containing a ketomethylene (—CH₂—CO—) group selected from those represented by the following general formula:

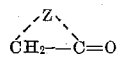

wherein Z represents the non-metallic atoms necessary to complete a heterocyclic nucleus of the 2-thio-2,4(3,5)-imidazoledione series with a dialkoxymethyl carboxylate selected from those represented by the following general formula:

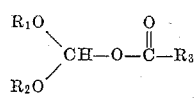

wherein R₁, R₂ and R₃ each represents an alkyl group of the formula $C_nH_{2n+1}$ wherein $n$ represents a positive integer from 1 to 4.

6. A process for preparing a dye comprising condensing an organic compound containing a ketomethylene (—$CH_2$—CO—) group selected from those represented by the following general formula:

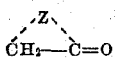

wherein Z represents the non-metallic atoms necessary to complete a heterocyclic nucleus of the 2-thio-2,4(3,5)-imidazoledione series with a dialkoxymethyl acetate selected from those represented by the following general formula:

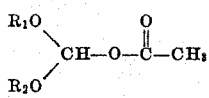

wherein $R_1$ and $R_2$ each represents an alkyl group of the formula $C_nH_{2n+1}$ wherein $n$ represents a positive integer from 1 to 4.

7. A process for preparing a dye comprising condensing 3-ethyl-1-phenyl-2-thio-2,4(3,5)-imidazoledione(3-ethyl-1-phenyl-2-thiohydantoin) with diethoxymethyl acetate.

8. A process according to claim 1 wherein the reaction is carried out in a reaction medium selected from the group consisting of triethylamine, tri-n-butylamine, pyridine, acetic anhydride, 1,4-dioxane, piperidine, acetic acid, formamide, nitromethane, nitrobenzene and cresols.

SAMUEL G. DENT, JR.
LESLIE G. S. BROOKER.

REFERENCES CITED

The following references are of record in the file of this patent:

UNITED STATES PATENTS

| Number | Name | Date |
|---|---|---|
| 2,274,782 | Gasper | Mar. 3, 1942 |